United States Patent [19]

Heung

[11] Patent Number: 5,296,438
[45] Date of Patent: Mar. 22, 1994

[54] DIMENSIONALLY STABLE METALLIC HYDRIDE COMPOSITION

[75] Inventor: Leung K. Heung, Aiken, S.C.

[73] Assignee: The United States of America as represented by the United States Department of Energy, Washington, D.C.

[21] Appl. No.: 952,931

[22] Filed: Sep. 29, 1992

[51] Int. Cl.$^5$ .............. B01J 20/10; H01J 7/18; C01B 6/24; F17C 11/00
[52] U.S. Cl. .............. 502/407; 206/0.7; 252/181.6; 420/900; 423/248; 502/406; 502/414
[58] Field of Search .............. 502/406, 414, 407; 252/181.6; 423/644, 248; 420/900; 206/0.7

[56] References Cited

U.S. PATENT DOCUMENTS

| | | | |
|---|---|---|---|
| 3,963,826 | 6/1976 | Anderson et al. | 423/248 |
| 4,036,944 | 7/1977 | Blytas | 423/648 |
| 4,110,425 | 8/1978 | Buhl et al. | 423/648 |
| 4,142,300 | 3/1979 | Gruen et al. | 420/900 |
| 4,249,654 | 2/1981 | Helversen | 206/0.7 |
| 4,292,265 | 9/1981 | Ron et al. | 264/82 |
| 4,310,601 | 1/1982 | Bernauer et al. | 206/0.7 |
| 4,360,505 | 11/1982 | Sheridan et al. | 420/900 |
| 4,433,063 | 2/1984 | Bernstein et al. | 502/402 |
| 4,459,270 | 7/1984 | Leppard et al. | 423/248 |
| 4,507,263 | 3/1985 | Ron | 423/644 |
| 4,589,919 | 5/1986 | Goodell et al. | 75/251 |
| 4,996,002 | 2/1991 | Sandrock et al. | 252/181.6 |

*Primary Examiner*—Paul E. Konopka
*Attorney, Agent, or Firm*—Brian R. Tumm; Harold M. Dixon; William R. Moser

[57] ABSTRACT

A stable, metallic hydride composition and a process for making such a composition. The composition comprises a uniformly blended mixture of a metal hydride, kieselguhr, and a ballast metal, all in the form of particles. The composition is made by subjecting a metal hydride to one or more hydrogen absorption/desorption cycles to disintegrate the hydride particles to less than approximately 100 microns in size. The particles are partly oxidized, then blended with the ballast metal and the kieselguhr to form a uniform mixture. The mixture is compressed into pellets and calcined. Preferably, the mixture includes approximately 10 vol. % or more kieselguhr and approximately 50 vol. % or more ballast. Metal hydrides that can be used in the composition include Zr, Ti, V, Nb, Pd, as well as binary, tertiary, and more complex alloys of La, Al, Cu, Ti, Co, Ni, Fe, Zr, Mg, Ca, Mn, and mixtures and other combinations thereof. Ballast metals include Al, Cu and Ni.

14 Claims, No Drawings

DIMENSIONALLY STABLE METALLIC HYDRIDE COMPOSITION

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to hydride compositions. In particular, the present invention relates to a metallic hydride composition that can undergo repeated hydrogen absorption/desorption cycles without disintegrating, and a process for making such a composition.

2. Discussion of Background

Metal hydrides are capable of absorbing large amounts of hydrogen which can then be desorbed under the appropriate temperature and pressure conditions. These materials have many applications, particularly in the hydrogen processing and energy conversion fields. They are used for hydrogen storage, hydrogen pumping and compression, heat pumps, batteries, and fuel cells. Hydrides are selective in that they only absorb hydrogen, and also differentially absorb the three isotopes of hydrogen (protium, deuterium, and tritium). Thus, hydrides are useful in hydrogen isotopes purification and separation.

Known hydride formers (loosely called hydrides) include pure metals (Mg, Ti, V, Nb, Pt, Pd, and so forth) and alloys (the La-, Ti-, and Co- alloys, and rare earth-Ni alloys). The capacity of a particular material to absorb or release hydrogen depends on the temperature, the external hydrogen gas pressure, and the surface area of the material. To maximize the surface area and the absorption/desorption efficiency, the hydride is often supplied in the form of small-grained particles or pellets.

In typical applications, the hydride particles are subjected to repeated absorption/desorption cycles. With each cycle, the particle size is reduced until, eventually, the particles disintegrate into a fine-grained powder. The powder forms a dense compact that is not readily permeable to hydrogen, so the efficiency of the process is reduced. It is a poor heat conductor, further reducing the efficiency of both the absorption and desorption phases of the cycle. The compacted powder can expand during the absorption phase, potentially damaging the container. Furthermore, the powder can readily become entrained in the gas stream, migrating and causing contamination of downstream piping and equipment. Even if filters are used, the fine mesh required for the small particles is easily clogged.

Various hydride compositions have been developed in attempts to alleviate the problems associated with pure hydrides. A metal hydride may be mixed with a non-hydridable ballast or matrix metal, as disclosed by Goodell, et al. (U.S. Pat. No. 4,589,919) and Ron et al. (U.S. Pat. No. 4,292,265). Hydride particles may be contained in a polymeric composition, such as the compositions described by Bernstein, et al. (U.S. Pat. No. 4,433,063), Bühl, et al. (U.S. Pat. No. 4,110,425), and Blytas (U.S. Pat. No. 4,036,944).

Numerous methods and processes are known for making hydride compositions. Leppard (U.S. Pat. No. 4,459,270) discloses a process for removing hydrogen from an oxygen-containing wet air stream by contact with a hydride composition. The composition is prepared by dry blending tin oxide with 10-50% alumina trihydrate. The mixture is pressed into pellets that are dried, calcined, and impregnated with 0.25-2.5 wt.% each of Pt and Pd. The pellets are dried and calcined in air, reduced in a gas stream of 5% hydrogen and 95% nitrogen, and cooled in nitrogen. When cool, a gas mix containing 1-10% hydrogen in nitrogen is flowed over the pellets.

Helversen (U.S. Pat. No. 4,249,654) discloses a hydrogen storage container having a hydrogen-storing material therein. The material comprises particles of a hydride-forming metal coated on the surface of a diatomaceous earth or other rare earth, porous ceramic, or glass fiber.

A stable hydrogen-absorbing composition and a method for making such a composition are described in commonly assigned and recently filed patent application Ser. No. 07/933,152, filed Aug. 21, 1992, titled Palladium/Kieselguhr Composition and Method. The composition is made by immersing a porous substrate such as kieselguhr in a concentrated solution of tetraamine palladium (II) nitrate. Palladium from the solution is deposited onto the substrate, which is then removed from the solution, dried, and calcined. This process is repeated until the desired amount of palladium has been deposited onto the substrate. Finally, the material is heat treated to ensure reduction of the palladium to metal.

Hydride compositions such as these, while withstanding repeated cycling better than pure hydrides, eventually disintegrate into a fine powder after a large number of absorption/desorption cycles. Many of these more stable compositions have relatively low hydride content and lower hydrogen-absorbing capability than a pure hydride.

There exists a need for a dimensionally stable hydride composition with a high hydride content that can reversibly absorb large amounts of hydrogen. The composition should have sufficient porosity to allow permeation of hydrogen gas, and maintain its hydrogen-absorbing capacity over a large number of absorption/desorption cycles.

SUMMARY OF THE INVENTION

According to its major aspects and broadly stated, the present invention is a stable, metallic hydride composition and a method for making such a composition. In particular, the composition comprises a uniformly blended mixture of a metal hydride, a porous component such as kieselguhr, and a ballast metal. The composition is made by subjecting a metal hydride to one or more hydrogen absorption/desorption cycles to disintegrate the hydride particles to a powder of less than approximately 100 microns in diameter. The particles are partly oxidized, then blended with particles of kieselguhr and a ballast metal into a uniform mixture. The mixture is compressed into pellets and calcined. Preferably, the mixture includes approximately 10 vol. % or more kieselguhr and approximately 50 vol. % or more ballast. The resulting composition is a dimensionally stable hydride compact. It has a high density and hydride content, yet sufficient porosity to allow permeation of hydrogen therethrough so that hydrogen can be rapidly absorbed/desorbed by the hydride. The composition can be expected to remain stable for over 100,000 absorption/desorption cycles.

An important feature of the present invention is the hydride. The hydride is subjected to a sufficient number of hydrogen absorption/desorption cycles to break down the particles to less than approximately 100 microns in size. The number of cycles needed depends on the particular hydride used and the initial particle size. Hydrides that can be used in the composition include Zr, Ti, V, Nb, Pd, as well as binary, tertiary, and more complex alloys of La, Al, Cu, Ti, Co, Ni, Fe, Zr, Mg, Ca, Mn, and so forth, and mixtures and other combinations thereof. For example, the hydridable $AB_{5-x}C_x$ alloys, where $0.1 \geq x \leq 1$ and the letters A, B, and C represent elements, can be used in the composition. In particular, the $LaNi_{5-x}Al_x$ alloys such as $LaNi_{4.25}Al_{0.75}$ are usable in the composition.

Another feature of the present invention is the porous component, preferably kieselguhr, which adds to the porosity of the composition. The kieselguhr is preferably supplied in the form of granules less than approximately 500 microns in size. Since the composition is highly porous, hydrogen readily permeates therethrough and is rapidly absorbed/desorbed by the hydride.

Still another feature of the present invention is the ballast metal. The ballast is preferably in the form of particles less than approximately 100 microns in size. It deforms plastically at relatively low pressures, has good heat transfer and ductility characteristics, and is capable of acting as a binder for the metal hydride particles. The hydride, kieselguhr and ballast are blended into a uniform mixture, increasing the resistance of the composition to problems such as disintegration or thermal breakdown. Preferably, the ballast is Al, Cu or Ni, or some other non-hydridable metal with similar properties.

Other features and advantages of the present invention will be apparent to those skilled in the art from a careful reading of the Detailed Description of a Preferred Embodiment presented below.

DETAILED DESCRIPTION OF A PREFERRED EMBODIMENT

A metallic hydride composition according to a preferred embodiment of the present invention comprises a uniformly blended mixture of a metal hydride, kieselguhr, and a ballast metal. Hydrides usable in the composition include hydridable metals and alloys, and mixtures and combinations thereof. Ballast materials include Al, Cu and Ni.

The composition is made as follows:

1. Hydride particles are subjected to one or more hydrogen absorption/desorption cycles to disintegrate the particles to a powder of less than approximately 100 microns in size. Each absorption/desorption cycle reduces the particle size, thus, it will be evident that the number of cycles needed depends on the particular hydride used and the initial size of the particles.

Hydrides that can be used in the composition include Zr, Ti, V, Nb, Pd, as well as binary, tertiary, and more complex alloys of La, Al, Cu, Ti, Co, Ni, Fe, Zr, Mg, Ca, Mn, and mixtures and other combinations thereof. For example, the hydridable $AB_{5-x}C_x$ alloys, where $0.1 \geq x \leq 1$ and the letters A, B, and C represent elements, can be used in the composition. In particular, the $LaNi_{5-x}Al_x$ alloys such as $LaNi_{4.25}Al_{0.75}$ are usable in the composition.

2. The surfaces of the hydride particles are oxidized, preferably by gradual exposure to air. The surface of each particle is covered by a thin layer of metal oxide, preventing further oxidation when handled in open air in the following steps.

3. The oxidized hydride particles are mixed with a porous component and a ballast metal. The porous component is preferably kieselguhr (porous diatomite; diatomaceous earth) in the form of granular particles less than approximately 500 microns in diameter. It is highly porous. The kieselguhr serves to increase the porosity of the composition so that hydrogen can readily permeate therethrough. It also provides void spaces to accommodate the expansion of the hydride particles during absorption and therefore increases the resistance of the composition to disintegration during repeated absorption/desorption cycles. If convenient, some other material with similar properties of porosity may be used, such as a porous glass, porous ceramic, or glass fiber.

The ballast metal is preferably a non-hydridable metal or alloy with good heat transfer and ductility characteristics that will deform plastically at relatively low pressures. It is capable of acting as a binder for the metal hydride and kieselguhr particles. The hydride and the kieselguhr are uniformly distributed throughout the ballast, increasing the resistance of the composition to problems such as disintegration or thermal breakdown. The ballast is also selected with a view to avoiding the potential for an exothermic reaction with the hydride. For example, a reaction between aluminum and $LaNi_5$ may take place at temperatures as low as 300° C. The ballast is preferably Al, Cu or Ni powder of less than 100 microns in particle size. If convenient, the ballast may be some other non-hydridable metal with similar properties.

The hydride, ballast and kieselguhr are blended so the hydride and kieselguhr are uniformly distributed throughout the mixture. The mixture includes approximately 10 vol. % or more kieselguhr and approximately 50 vol. % or more ballast. The proportions of the constituents of the mixture depend on the materials used. Thus, for a particular hydride and ballast, those proportions which optimize the hydrogen-absorbing properties and resistance to breakdown of the composition are best determined by a modest degree of experimentation.

4. The mixture is compressed into pellets. The pressure needed to form the pellets depends on the choice of hydride and ballast materials. The pellets may be fabricated in any convenient dimensions appropriate to the intended application.

5. If desired, the pellets are placed in a container to be heated to about 200° C. and evacuated for two or more hours, or until all or most volatile substances are removed. Since the pellets are formed from a mixture of particulate materials, air or other gases may be entrained. Other volatile contaminants (grease, solvents, and so forth) may be incorporated into the pellets during the manufacturing process. These may affect the performance of the final product if not removed.

6. The container is filled with helium and the pellets are calcined at approximately 500° C. for about 11 hours. As will be evident to one skilled in the art, the gas pressure, temperature, and time depend on the choice of hydride and ballast materials. While helium may be used, hydrogen and other inert or nonreactive (nonoxidizing) gases may be substituted if convenient. The gas pressure may range up to approximately 5,000 Torr, but is preferably approximately 800 Torr.

The composition is highly porous, so hydrogen readily permeates therethrough and is rapidly absorbed/desorbed by the hydride. The amount of hydrogen that can be absorbed depends on the choice of hydride and its atom ratio. For example, palladium hydride ($PdH_{0.7}$) has an atom ratio of 0.7, or 0.7 hydrogen atoms per palladium atom. $LaNi_{4.25}Al_{0.75}H_5$ has an atom ratio of 0.83, or 0.83 hydrogen atoms per metal atom. The absorption rate also depends on the temperature and gas pressure: generally, the lower the temperature and the higher the pressure, the greater the amount of hydrogen absorbed by the pellets. Conversely, the higher the temperature and the lower the pressure, the less hydrogen is absorbed.

The composition is a dimensionally stable hydride compact. It has a high density and hydride content, yet sufficient porosity to allow permeation of hydrogen therethrough so that the hydrogen can be absorbed/desorbed by the hydride. The composition can be expected to remain stable for over 100,000 absorption/desorption cycles.

It will be apparent to those skilled in the art that many changes and substitutions can be made to the preferred embodiment herein described without departing from the spirit and scope of the present invention as defined by the appended claims.

What is claimed is:

1. A composition for use in absorbing hydrogen, said composition made by a process comprising the steps of:
    providing a hydride in the form of particles;
    oxidizing the surfaces of said hydride particles;
    providing kieselguhr in the form of particles;
    providing a ballast metal in the form of particles;
    mixing said hydride particles with said kieselguhr and said ballast metal to form a uniformly blended mixture;
    compressing said mixture; and
    calcining said mixture so that said ballast metal binds said hydride and said kieselguhr into a porous compact that absorbs said hydrogen.

2. The composition as recited in claim 1, wherein said hydride is $LaNi_{5-x}Al_x$, where $0.1 \geq x \leq 1$.

3. The composition as recited in claim 1, wherein said ballast metal is selected from the group consisting essentially of Al, Cu, and Ni.

4. The composition as recited in claim 1, wherein said calcining step is carried out in an inert atmosphere.

5. The composition as recited in claim 1, wherein said hydride composition comprises by volume more than approximately 10% kieselguhr and at least approximately 50% ballast metal.

6. The composition as recited in claim 5, wherein said ballast metal is selected from the group consisting essentially of Al, Cu and Ni, and wherein said hydride is $LaNi_{5-x}Al_x$, where $0.1 \geq x \leq 1$.

7. The composition as recited in claim 1, wherein said process further comprises the step of removing volatile substances from said composition after said compressing and before said calcining.

8. The composition as recited in claim 1, wherein said hydride particles are less than approximately 100 microns in size.

9. A process for making a composition for absorbing hydrogen, said process comprising the steps of:
    subjecting a hydride to hydrogen absorption/desorption repeatedly until said hydride disintegrated into particles;
    oxidizing the surface of said hydride;
    mixing said hydride with kieselguhr in the form of particles and a ballast metal in the form of particles to form a uniformly blended mixture;
    compressing said mixture; and
    calcining said mixture so that said ballast metal binds said hydride and said kieselguhr into a porous compact for absorbing said hydrogen.

10. The process as recited in claim 9, wherein said absorption/desorption step is repeated until said hydride disintegrates into particles less than approximately 100 microns in size.

11. The process as recited in claim 9, wherein said hydride is $LaNi_{5-x}Al_x$, where $0.1 \geq x \leq 1$.

12. The process as recited in claim 9, wherein said ballast metal is selected from the group consisting essentially of Al, Cu and Ni.

13. The process as recited in claim 9, further comprising the step of removing volatile substances from said mixture after said compressing and before said calcining.

14. The process as recited in claim 9, wherein said calcining step is carried out in an inert atmosphere.

* * * * *